United States Patent [19]

Kikuchi

[11] Patent Number: 4,812,023
[45] Date of Patent: Mar. 14, 1989

[54] ZOOM FINDER

[75] Inventor: Juro Kikuchi, Tokyo, Japan

[73] Assignee: Olympus Optical Co., Ltd., Tokyo, Japan

[21] Appl. No.: 17,076

[22] Filed: Feb. 20, 1987

[30] Foreign Application Priority Data

Feb. 21, 1986 [JP] Japan .................................. 61-35019

[51] Int. Cl.[4] ...................... G02B 15/14; G02B 13/18; G03B 13/20; G03B 13/10
[52] U.S. Cl. .................................. 350/427; 350/432; 354/167; 354/222
[58] Field of Search ................. 350/423, 432, 427; 354/167, 222, 223, 219, 200, 195.13, 199, 400, 402, 403

[56] References Cited

U.S. PATENT DOCUMENTS

| | | | |
|---|---|---|---|
| 2,755,701 | 7/1956 | Altman | 350/423 |
| 2,859,654 | 11/1958 | Back | 350/123 |
| 3,141,921 | 7/1964 | Linke | 354/222 |
| 4,443,068 | 4/1984 | Itoh | 350/423 |
| 4,609,269 | 9/1986 | Kamata | 354/195.12 |
| 4,652,104 | 3/1987 | Harvey | 354/222 |
| 4,725,130 | 2/1988 | Ozawa | 350/427 |

FOREIGN PATENT DOCUMENTS 1236816  3/1967  Fed. Rep. of Germany ...... 350/423

Primary Examiner—John K. Corbin
Assistant Examiner—Ronald M. Kachmarik
Attorney, Agent, or Firm—Cushman, Darby & Cushman

[57] ABSTRACT

A zoom finder comprising a system for forming the image of a measuring field frame and a vari-focal system in the order from the object side and arranged that the apparent size of the measuring field frame varies at the time of zooming.

8 Claims, 2 Drawing Sheets

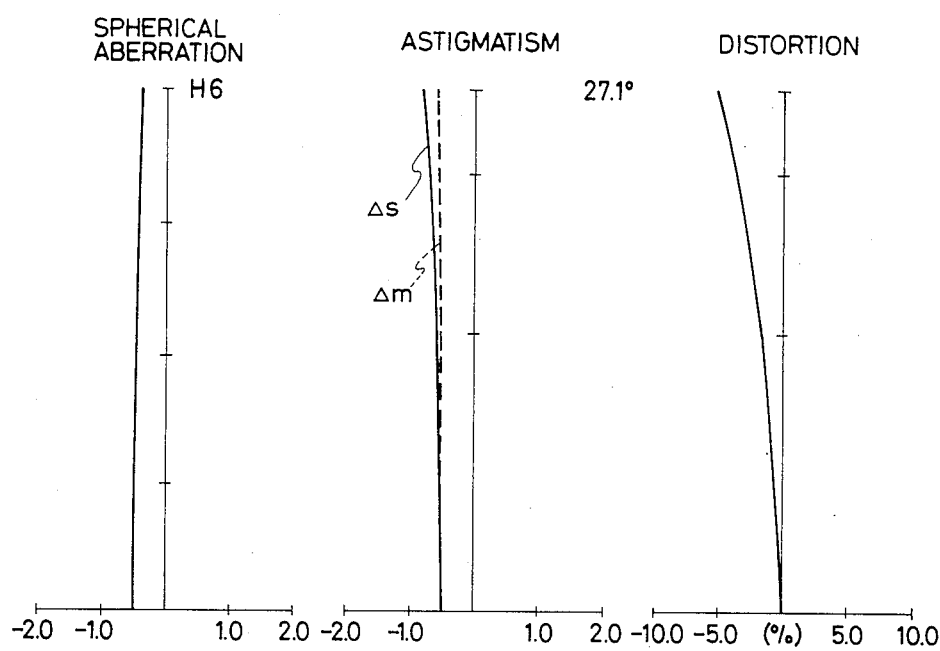
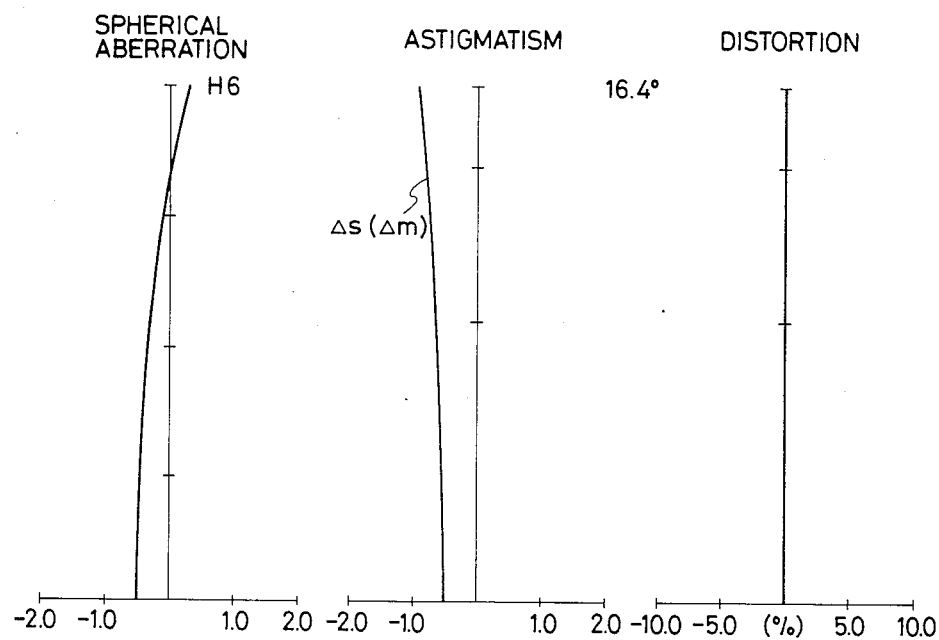

ZOOM FINDER

BACKGROUND OF THE INVENTION (a) Field of the invention:

The present invention relates to a zoom finder.

(b) Description of the prior art:

Known zoom finders are arranged that the apparent size of the measuring field frame thereof does not vary at the time of zooming. Therefore, when a known zoom finder is used with an active-type automatic focusing camera, the measuring field indicated on an object by the measuring field frame becomes large in the wide position and small in the teleposition though the size of the measuring beam spot on the object does not vary.

In an active-type automatic focusing camera, it is conventional to utilize a projected beam of light to illuminate an object to be photographed. A detector lens is employed to measure the lens upon detection of the light reflected to provide data for automatically focusing the camera lens. If the light from the projector does not correctly fall on the object, the distance will not be accurately measured so that the auto focus device will not operate to provide a clear picture. In a camera provided with a zoom finder where the finder operates between a wide angle and a telephoto position, the focusing beam light from the project lens, called the "measuring beam spot", can easily be improperly located when a shift is made between the side angle and telephoto positions of the zoom finder.

Thus, in case that the size of the measuring field frame is adjusted to the size of the measuring beam spot in the state of the wide position, when photographing two persons who stand side by side for example, it apparently looks as if the measuring beam passes through the space between the two persons, when zoomed to the teleposition, in spite of the fact that the measuring beam is virtually striking upon the two persons sufficiently. Hence, to focus on the object accurately, it is unavoidable to put either of the two persons into the measuring field frame and, consequently, a photograph is often taken in such state that one of the two persons comes to a position near the center of the field in spite of the fact that it is actually possible to take a photograph by putting the two persons to the central portion of the field in a well balanced state.

On the other hand, in case that the size of the measuring field frame is adjusted to the size of the measuring beam spot in the state of the teleposition, it apparently looks, when zoomed to the wide position, as if the measuring beam is sufficiently striking upon the two persons in spite of the fact that the measuring beam is virtually passing through the space between the two persons and, as a result, the photograph often becomes out of focus.

It will be apparent, therefore, that in a circumstance where a user is photographing two objects, for example, two persons standing apart from each other but side by side, the measuring field frame, which is the focusing frame, is so adjusted as to be coincident with the diameter of the measuring beam spot at a wide angle position so that the focusing frame will overlap or cover both of the objects. In this condition, the light beam emitted from the camera will fall on both of the objects and it is therefore possible for the camera to correctly measure the distance to the objects. However, when these objects are to be photographed at the tele position by zooming the lens system from the wide angle position to the telephoto position, the finder will also be set at the telephoto position and the images of the objects observed through the finder will be enlarged and the space between the objects will increase in width. However, in the conventional camera of this type, the image size of the measuring field frame remains unchanged since the actual distance from the camera to the objects does not vary. Accordingly, the light beam for measuring the distance will still fall on both of the objects in the same manner as when the focusing finder is adjusted to the wide angle position. However, many photographers, particularly those of limited experience for whom these cameras are specifically designed, have tended to misjudge the location of the light beam distance measuring spot as it appears that it does not fall on both of the objects when the finder is zoomed to the telephoto position. In this circumstance, many users will shift the camera so that the light beam spot will fall on one of the objects which procedure can result in an unbalanced and therefore less than satisfactory photograph. On the other hand, when the focusing frame is adjusted in the telephoto position and then switched to the wide angle position through the zooming operation, the image of the measuring field frame, the focusing frame, is actually located between the two objects in the view of the user while in fact the beam is actually illuminating both objects so that the camera will measure the distance correctly and properly focus the camera. Also in this case, when the user switches from the telephoto position to the wide angle position, again, the actual distance between the camera and the objects is unchanged so that a correct measured distance will be effected. Unfortunately, when the measuring field frame is adjusted with the light beam spot in the telephoto position and then switched from the telephoto position to the wide position by zooming the lens system, the image of the measuring field frame, the focusing frame, is actually located between the object but since the focusing frame is located so as to cover both of the objects the camera will be capable of correctly measuring the distance but, as noted above, the user is likely to misjudge the operation of the camera.

It is usually the condition where the zooming is effected from the telephoto to the wide angles that errors effected by the user occur since, in this circumstance, the measuring light beam only apparently is in the correct position for measuring distance when in fact, in the circumstance where two people are standing side by side the measuring light beam will fall between.

A zoom finder disclosed in Japanese published examined patent application No. 9389/58 is known as a zoom finder whose lens system has a distribution of refractive power resembling the distribution of refractive power in the preferred embodiment of the zoom finder according to the present invention, in other words, a zoom finder whose lens system forms a Galilean telescope comprising three lens units, i.e., a positive, negative and positive lens units. However, in case of said known zoom finder, any consideration is not given to indication of a measuring field frame and/or measuring beam spot into the field and, therefore, any solution is not given to the afore-mentioned disadvantage of known zoom finders.

SUMMARY OF THE INVENTION

It is, therefore, a primary object of the present invention to provide a zoom finder arranged that the size of the image of the measuring field frame varies at the time of zooming.

To attain the above-mentioned object, the zoom finder according to the present invention is arranged to comprise a system for forming the image of the measuring field frame, and a vari-focal system, in the order from the object side, and is thereby arranged that the apparent size of the measuring field frame varies when the zoom finder is zoomed by means of the vari-focal system.

For the zoom finder according to the present invention, it is preferable to arrange that said system for forming the image of the measuring field frame has negative refractive power and said vari-focal system comprises a lens unit which has positive refractive power and which is located on the object side therein. Besides, a surface on which the meauring field frame is printed is arranged in front of said lens unit having positive refractive power, and one of surfaces in said system for forming the image of the measuring field frame is arranged as a semitransparent mirror so that the image of the measuring field frame is formed. In other words, the surface on which the measuring field frame is printed is provided between said semitransparent mirror and said lens unit having positive refractive power.

Besides, it is preferable to arrange that a subsystem (one lens unit or a plural number of lens units), which is located in rear of said lens unit having positive refractive power in the vari-focal system, has negative refractive power as a whole.

The zoom finder according to the present invention comprises, for example, a first lens unit $G_1$ having negative refractive power, a second lens unit $G_2$ having positive refractive power, and a third lens unit $G_3$ having negative refractive power in the order from the object side as shown in FIGS. 1 and 2. The first lens unit $G_1$ is arranged to serve as a system for forming the image of the measuring field frame and to form the image of the measuring field frame at the position of the rear focal point of the first lens unit $G_1$. The second lens unit $G_2$ is the positive lens unit in the vari-focal system and is arranged to chiefly perform the vari-focal action. To arrange that the displacement of the image point to be caused by the vari-focal action of the second lens unit $G_2$ becomes small, the imaging magnification range of the second lens unit $G_2$ from the wide position to the tele position (from $\beta_{2W}$ to $\beta_{2T}$) of the second lens unit $G_2$ is selected in the range of around $-1/\sqrt{R}$ to around $-\sqrt{R}$ where reference symbol R represents the vari-focal ratio. The angular magnification at the wide angle position may be represented by $\gamma_W$ and that at the telephoto position as $\gamma_T$. Then, the vari-focal ratio R is expressed as $R = \gamma_T / \gamma_W$. The third lens unit $G_3$ is arranged to have negative refractive power as a whole and to be moved at the time of zooming so that the image formed by the first and second lens units will be observed with a suitable diopter. In other words, the second lens unit $G_2$ and third lens unit $G_3$ constitute a so-called vari-focal system and, out of them, the third lens unit $G_3$ may be arranged to have the function as a compensator.

In the zoom finder according to the present invention described so far, the first lens unit $G_1$ is located at a position where the heights of principal rays are high compared with the heights of paraxial rays and, therefore, the first lens unit $G_1$ has large influence on offaxial aberrations, i.e., astigmatic difference, curvature of field, distortion, etc. Therefore, to correct said offaxial aberrations, it is preferable to arrange that the first lens unit $G_1$ is provided with a surface which is concentric with the stop and a surface on which principal rays are incident at comparatively large angles and, moreover, a suitable surface in the first lens unit $G_1$ is formed as an aspherical surface.

The second lens unit $G_2$ is located at a position where the heights of paraxial rays are high compared with the heights of principal rays. Therefore, it tends to cause spherical aberration which is paraxial aberration and, moreover, said spherical aberration varies at the time of zooming. To solve the above-mentioned problem, for the second lens unit $G_2$, it is preferable to use a glass material with a high refractive index so that radii of curvature of respective surfaces become large and, at the same time, to arrange respective surfaces so that the incident angles of paraxial rays on those surfaces become small.

The third lens unit $G_3$ is located at a position where both of the heights of principal rays and heights of paraxial rays are low, but it is possible to control the value of spherical aberration by means of the third lens unit $G_3$.

The variation of the diopter to be caused by zooming can be eliminated by moving said third lens unit $G_3$ as described before. In that case, it is also possible to further divide the third lens unit $G_3$ into two subunits and to move the lens (subunit) on the front side only so as to eliminate said variation of the diopter. The diopter can be kept constant also when the first lens unit $G_1$ is moved by keeping the third lens unit $G_3$ fixed. As another method for keeping the diopter constant, the second lens unit $G_2$ may be divided into two subunits and either of them may be moved by keeping both of the first lens unit $G_1$ and third lens unit $G_3$ fixed. In that case, it is possible to perform zooming in the state that the diopter is kept constant when the second lens unit $G_2$ is moved by varying the airspace between said two subunits. As the third lens unit $G_3$ serves also as an eyepiece, it is preferable to arrange that at least the lens (subunit) thereof on the eye point side is not moved.

By arranging as described so far, it is possible to obtain an excellent zoom finder which makes it possible to attain the object of the present invention and, at the same time, which is arranged that aberrations are corrected favourably.

BRIEF DESCRIPTION OF THE DRAWINGS

FIGS. 4 and 5 respectively show graphs illustrating aberration curves of said embodiment of the present invention in the wide position and teleposition.

DETAILED DESCRIPTION OF THE PREFERRED EMBODIMENT

Figure 1:
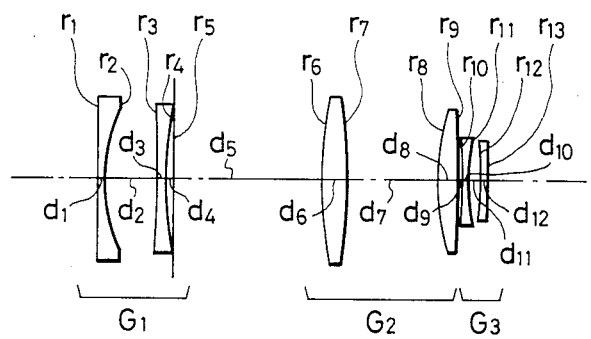
FIGS. 1 and 2 respectively show sectional views of a preferred embodiment of the zoom finder according to the present invention in the wide position and teleposition.
Figure 2:
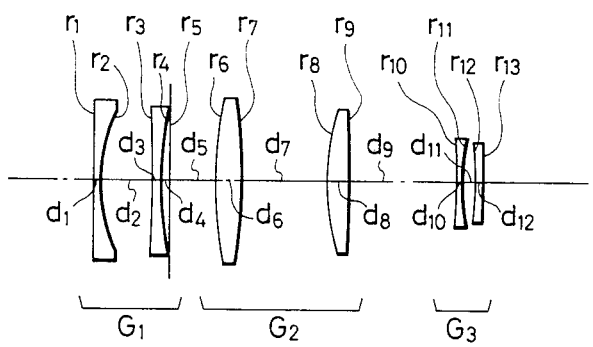

Now, the preferred embodiment of the zoom finder according to the present invention described so far is shown below. Said preferred embodiment of the present invention has the lens configuration as shown in FIGS. 1 and 2. Out of them, FIG. 1 shows said embodiment in the wide position and FIG. 2 shows said embodiment in the teleposition. Said embodiment has the numerical data shown below.

| | | |
|---|---|---|
| $r_1 = \infty$ | | |
| $d_1 = 1$ | $n_1 = 1.6968$ | $\nu_1 = 5.55$ |
| $r_2 = 26.338$ | | |
| $d_2 = 7.9$ | | |
| $r = -119.226$ | | |
| $d_3 = 1.1$ | $n_2 = 1.50$ | $\nu_2 = 57.5$ |
| $r_4$ (aspherical surface) | | |
| $d_4 = 1.16$ | | |
| $r_5 = \infty$ (measuring field frame) | | |
| $d_5 = 21.006 \sim 6.397$ | | |
| $r_6 = 70.851$ | | |
| $d_6 = 3.82$ | $n_3 = 1.7725$ | $\nu_3 = 49.6$ |
| $r_7 = -70.731$ | | |
| $d_7 = 12.81$ | | |
| $r_8 = 39.115$ | | |
| $d_8 = 3$ | $n_4 = 1.7725$ | $\nu_4 = 49.6$ |
| $r_9 = -206.024$ | | |
| $d_9 = 1.033 \sim 16.433$ | | |
| $r_{10} = -88.286$ | | |
| $d_{10} = 1$ | $n_5 = 1.50$ | $\nu_5 = 57.5$ |
| $r_{11} = 28.630$ | | |
| $d_{11} = 1.58$ | | |
| $r_{12} = -101.085$ | | |
| $d_{12} = 1.01$ | $n_6 = 1.51633$ | $\nu_6 = 64.1$ |
| $r_{13} = \infty$ | | |
| $d_{13} = 15$ | | |
| $r_{14}$ (eye point) | | |

In the numerical data shown in the above, reference symbols $r_1$ through $r_{14}$ respectively represent radii of curvature of respective lens surfaces, reference symbols $d_1$ through $d_{13}$ respectively represent thicknesses of respective lenses and airspaces between respective lenses, reference symbols $n_1$ through $n_6$ respectively represent refractive indices of respective lenses, and reference symbols $\nu_1$ through $\nu_6$ respectively represent Abbe's numbers of respective lenses.

In said embodiment, the method to form the image of the measuring field frame is adopted in the same way as Albada finder, and the measuring field frame is printed on a film and is located at the position of $r_5$. Besides, a semitransparent mirror is provided to the surface $r_2$ and serves to form the image of the measuring field frame at the position of the rear focal point of the first lens unit $G_1$. As another method, it may be arranged that the semitransparent mirror is obliquely provided in the space between the first lens unit $G_1$ and second lens unit $G_2$ and the image of the measuring field frame is introduced onto the optical axis of the finder optical system.

Figure 3:
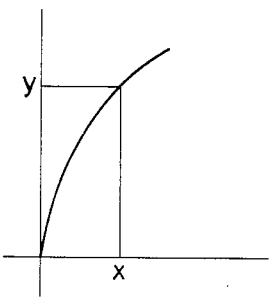
FIG. 3 shows a coordinate system illustrating the shape of the aspherical surface adopted in said embodiment of the present invention.

The surface $r_4$ is arranged as an aspherical surface which is expressed by the formula shown below when the coordinate system is set as shown in FIG. 3 (Where the optical axis is traced as the x axis).

$$X = \frac{y^2/r}{1 + \sqrt{1 - Py^2/r^2}}$$

In case of the preferred embodiment, $r_4 = 52.996$ and $P_4 = 0.0009$ (where, reference symbol $r_4$ represents the radius of curvature of the vertex portion of the aspherical surface, and reference symbol $P_4$ represents the coefficient of cone).

Aberration curves of said embodiment in the wide position and teleposition are as shown in FIGS. 4 and 5 respectively.

By the arrangement described so far, the zoom finder according to the present invention makes it possible to uniformly maintain the relation between the sizes and positions of the image of the measuring field frame and measuring beam spot independently of the state of zooming. Besides, as the zoom finder according to the present invention is arranged to comprise a negative, positive and negative lens units, it is possible to arrange that a space for accommodating the system for forming the image of the measuring field frame is provided in front of the vari-focal system in spite of the fact that the number of lenses constituting the zoom finder is small.

I claim:

1. A zoom finder comprising:
   a system for forming an image of a measuring field frame, said system including a semitransparent mirror; and
   a vari-focal lens system, said measuring field frame forming system and said vari-focal lens system being formed in that order from the object side of the zoom finder.

2. A zoom finder according to claim 1 wherein said system for forming the image of the measuring field frame has negative refractive power, and said vari-focal system comprises a lens unit having positive refractive power and located on the extreme object side therein.

3. A zoom finder comprising:
   a system for forming an image of a measuring field frame, said system having negative refractive power and including a semi-transparent mirror; and
   a vari-focal lens system having a lens unit having positive refractive power disposed on the extreme object side thereof and a subsystem having negative refractive power disposed in rear of said lens unit, said measuring field frame forming system and said vari-focal lens system being formed in that order from the object side of the zoom finder.

4. A zoom finder according to claim 3 arranged that said lens unit having negative refractive power which is comprised in said vari-focal system is moved at the time of zooming.

5. A zoom finder according to claim 4 wherein said system for forming the image of the measuring field frame comprises two negative lenses, and said vari-focal system comprises a lens unit having positive refractive power which comprises two positive lenses, and a lens unit having negative refractive power which comprises two negative lenses, and wherein the surface on the rear side of the second negative lens in said system for forming the image of the measuring field frame is arranged as an aspherical surface expressed by the formula shown below when the x axis is traced in the direction of the optical axis and the y axis is traced in the direction perpendicular to the optical axis taking the intersecting point between the optical axis and said aspherical surface as the origin:

$$x = \frac{y^2/r}{1 + \sqrt{1 - Py^2/r^2}}$$

where, reference symbol r represents the radius of curvature of the vertex portion of the aspherical surface, and reference symbol P represents the coefficient of cone.

6. A zoom finder according to claim 3 wherein said lens unit having negative refractive power which is comprised in said vari-focal system comprises two subunits and, out of said two subunits, only the subunit located on the object side is moved at the time of zooming.

7. A zoom finder according to claim 3 wherein said lens unit having positive refractive power which is comprised in said vari-focal system is arranged to comprise two subunits and arranged to be moved as a whole, at the time of zooming, by varying the airspace between said two subunits.

8. A zoom finder comprising:
a system for forming an image of a measuring field frame, said system having negative refractive power and including a semi-transparent mirror; and
a vari-focal lens system having a lens unit having positive refractive power disposed on the extreme object side thereof, said lens unit having a chiefly vari-focal function and a lens unit having a negative refractive power which comprises an eye piece, said measuring field frame forming system and said vari-focal lens system being formed in that order from the object side of the zoom finder.

* * * * *